US012527263B2

(12) United States Patent
Lin et al.

(10) Patent No.: US 12,527,263 B2
(45) Date of Patent: Jan. 20, 2026

(54) ENDOPHYTIC MAGNAPORTHIOPSIS INCRUSTANS M-B927 AND ITS APPLICATION

(71) Applicant: ZHEJIANG ACADEMY OF AGRICULTURAL SCIENCES, Hangzhou (CN)

(72) Inventors: Fucheng Lin, Hangzhou (CN); Zhenzhu Su, Hangzhou (CN); Lin Li, Hangzhou (CN); Yan Liang, Hangzhou (CN); Kunlun Shen, Hangzhou (CN)

(73) Assignee: ZHEJIANG ACADEMY OF AGRICULTURAL SCIENCES, Hangzhou (CN)

( * ) Notice: Subject to any disclaimer, the term of this patent is extended or adjusted under 35 U.S.C. 154(b) by 839 days.

(21) Appl. No.: 17/744,665

(22) Filed: May 14, 2022

(65) Prior Publication Data

US 2022/0361422 A1 Nov. 17, 2022

(30) Foreign Application Priority Data

May 14, 2021 (CN) ........................ 202110529909.6

(51) Int. Cl.
*A01G 13/00* (2006.01)
*C12N 1/14* (2006.01)

(52) U.S. Cl.
CPC ............ *A01G 13/00* (2013.01); *C12N 1/145* (2021.05)

(58) Field of Classification Search
CPC ................................ A01G 13/00; C12N 1/145
IPC ...................................................... C12N 1/145
See application file for complete search history.

(56) References Cited

FOREIGN PATENT DOCUMENTS

CN 109769535 5/2019

*Primary Examiner* — Zohreh A Fay
(74) *Attorney, Agent, or Firm* — Jiwen Chen; Joywin IP Law PLLC

(57) ABSTRACT

The present invention discloses an endophytic fungal strain Magnaporthaceae sp. M-B927 and an application thereof, and belongs to the technical filed of microbial applications. The deposit number of the endophytic fungal strain M-B927 is CCTCC M 2021503, and the scientific name thereof is Magnaporthaceae sp. The endophytic fungal strain M-B927 can enhance the resistance of rice against seedling leaf blast with a control efficiency of 73.06% and a disease index reduced by 52.22. Popularization and application of the biological control efficiency of the endophytic fungus M-B927 against seedling leaf blast in rice has great potential in the field of agriculture.

5 Claims, 3 Drawing Sheets

Specification includes a Sequence Listing.

ENDOPHYTIC MAGNAPORTHIOPSIS INCRUSTANS M-B927 AND ITS APPLICATION

This application claims priority to Chinese Patent Application No. 2021105299096 filed May 14, 2021, which is hereby incorporated by reference.

FIELD OF TECHNOLOGY

The present invention relates to the technical field of disease control in plants and, in particular, to an endophytic fungal strain Magnaporthaceae sp. M-B927 and its application in control of rice blast.

BACKGROUND TECHNOLOGY

Rice blast is one of the important diseases of rice, caused by *Phyricularia grisea* (Cooke) Sacc. and *Pyricularia oryae* Cav. Rice blast is an epidemic transmitted on air currents, posing a great threat to rice production. While the degree of damage varies depending on the cultivars, culture techniques and climatic conditions, a yield reduction of 10%-20% is generally seen, with crop failures in local fields. Rice blast may occur throughout the growth duration of rice. It can be divided into seedling blast, leaf blast, collar blast, node blast, seedling leaf blast, branch blast and grain blast depending on the growth stage and the part of the plant that is affected, among which seedling leaf blast has the greatest impact on yield.

Currently the most cost-effective way for the prevention of the disease is cultivation of a rice cultivar with disease resistance. However, the disease resistance may be lost due to mutation or adaptation of races of the pathogens during long cultivation of a rice cultivar with a single resistance gene, resulting in a recurrence of the disease. Besides, rice blast is generally controlled with chemical fungicides as well. However, prolonged overuse of chemical fungicides not only increases the production cost of rice, but causes safety problems in rice quality and pollution of ecological environment. Therefore, it has become a hot study topic in disease control in plants to search for efficient, environment friendly, green and safe biological control measures.

Biological control is a method of reducing the number of pathogens or the pathogenicity thereof using various adverse effects of beneficial microorganisms on pathogens (such as anti-bacteria effect, bacteriolytic effect, competition, mycoparasitism, etc.); meanwhile, the beneficial microorganisms for biological control may also induce an enhanced disease resistance of plants, enhance the immunity of plants, and delay, relieve or inhibit the induction of diseases.

There are a lot of beneficial microorganisms hiding in the ecological system of the nature, among which are the endophytic fungi in plants. The endophytic fungi in plants refer to a group of fungi which can invade and colonize healthy plant tissues during at least a part of the life cycle thereof without causing apparent disease symptoms in the host. Commonly existing in ecological systems, the endophytic fungi have very stable long-term interactions with the host plants. During the formation of the mutualism between the endophytic fungi in plants and the hosts, on one hand, the endophytic fungi in plants obtain water and mineral nutrients among other nutrients required for growth from the host, while on the other hand, the endophytic fungi in plants also provide the plants with various biological functions, such as promoting the growth of plants, improving the biomass of plants, and enhancing the capability of host plants against biotic and abiotic stresses.

The invention patent under the application number CN201910044093.0 disclosed a use of an endophytic fungal strain R5-6-1 in control of rice bacterial leaf blight. However, there is no report yet so far of functions of other endophytic fungal strains in wild rice in control of seedling leaf blast in rice.

SUMMARY OF THE INVENTION

An object of the present invention is to provide an endophytic fungus from a wild rice, wherein the strain may enhance the resistance of rice against rice blast so as to achieve control of seedling leaf blast in rice.

To achieve the above object, the following technical scheme is adopted herein.

An endophytic fungal strain of Magnaporthaceae sp. was isolated from the root system of wild rice *Oryza granulate* collected from Yunnan Province. The ITS sequence of the endophytic fungal strain is as set forth in SEQ ID No. 1, and the major biological features thereof are that, the colony grew fast on a PDA plate and the colony diameter could reach 6 cm after growing on the PDA plate at 25° C. for 5 days; aerial mycelia were poorly developed, prostrating on medium surface, and the colony was white initially and, at a later stage, the middle of the colony turned black while the outer ring was white, the mycelia were 2-4 μm in width; conidiophores were solitary, unbranched; conidia were elliptic, no septum, 8.0-13.0×5.0-8.0 μm. The strain was identified by phylogenetic analysis as belonging to *Magnaporthiopsis incrustans* in the family Magnaporthaceae in the class Sordariomycetes in the phylum Ascomycota in the kingdom Fungi, was designated with the scientific name Magnaporthaceae sp., and was deposited on May 8, 2021 at the China Typical Culture Conservation Center in Wuhan, China, the recognized IDA under the Budapest Treaty on the International Recognition of the Deposit of Microorganisms for the Purposes of Patent Procedure, under the deposit number CCTCC M 2021503.

The culture conditions for the endophytic fungus M-B927 are: inoculation of the mycelia of the endophytic fungus M-B927 on a PDA solid culture medium and incubation at 25° C. in the dark for 5 days.

It is demonstrated by the study of the present invention that after colonization of the endophytic fungal strain M-B927 in the root tissues of rice, the control efficiency against seedling leaf blast in rice at seedling stage was up to 73.06%.

Therefore, the present invention provides a use or application of the endophytic fungus M-B927 in control of rice blast.

The use or application includes: colonization of the endophytic fungus M-B927 in a root tissue of rice.

Further, the use or application includes: co-cultivation of germinated rice seeds and the endophytic fungus M-B927 for colonization of the fungus in roots of rice seedlings to enhance resistance of rice against seedling leaf blast at seedling stage.

Preferably, the rice seeds are surface-sterilized and then germinate at 22-25° C. The detailed method is: the rice seeds are peeled, surface-sterilized in 1.0% sodium hypochlorite solution for 10 min and rinsed 3 times with sterile water. The sterilized seeds were then planted in half-strength Murashige and Skoog (MS) medium and cultivated for 2-3 days in a constant-temperature incubator for seed germination.

Preferably, the germinated seeds are planted in half-strength MS medium, and mycelium plugs of the endophytic fungus M-B927 were inoculated.

Preferably, the conditions of co-cultivation are: cultivation at 22-25° C. for 15-20 days, under light for 16 hours and in the dark for 8 hours per day.

The beneficial effects of the present invention are as follows.

The present invention provides an endophytic fungal strain M-B927 which can enhance the disease resistance of rice against rice blast. By co-cultivation of the endophytic fungus M-B927 and germinated rice seeds, the fungus colonized the roots of rice seedlings so as to reduce the damage on the leaves caused by the pathogen *Magnaporthe oryzae* and enhance the resistance of rice against seedling leaf blast at seedling stage. The disease index of the control group was 71.48, and the disease index of and the strain M-B927 treatment group was 19.26, that is, dropped by 52.22, and the control efficiency reached 73.06%. Popularization and application of the biological control efficiency of the endophytic fungus M-B927 against seedling leaf blast in rice has great potential in the field of agriculture.

DESCRIPTION OF THE EMBODIMENTS

The present invention is further described hereinafter in combination with detailed examples, but the present invention is not limited hereto. Unless otherwise specified, the technical means adopted in the examples are all regular art, and the reagents are all commercially available.

Example 1 Isolation and Identification of Endophytic Fungus M-B927

I. Strain Isolation and Purification

Strain M-B927 was isolated from the root system of *Oryza granulata* from Yunnan Province. Firstly, the root system of the wide rice was continuously rinsed with tap water and the soil particles and appendages were carefully removed. Healthy root tissues were picked for surface sterilization, and were immersed in 75% ethanol for 1-2 min and 1% sodium hypochlorite for 4-5 min, and subsequently, the roots were rinsed with sterile deionized water three times. The root tissues were cut into 0.5 cm long segments, which were then transferred into 2% malt extract agar (MEA, OXOID, with 50 mg/L of chloramphenicol added to inhibit the growth of endophytic bacteria) plates for incubation at 25° C. in the dark. Endophytic fungal mycelia emerged from the edge of the tissue cuts on the fifth day of culture, and were carefully picked with an inoculation loop and transferred into a fresh PDA medium for purification and cultivation. The strain was recorded as M-B927.

II. Strain Identification

1. Morphological Identification

Figure 1:
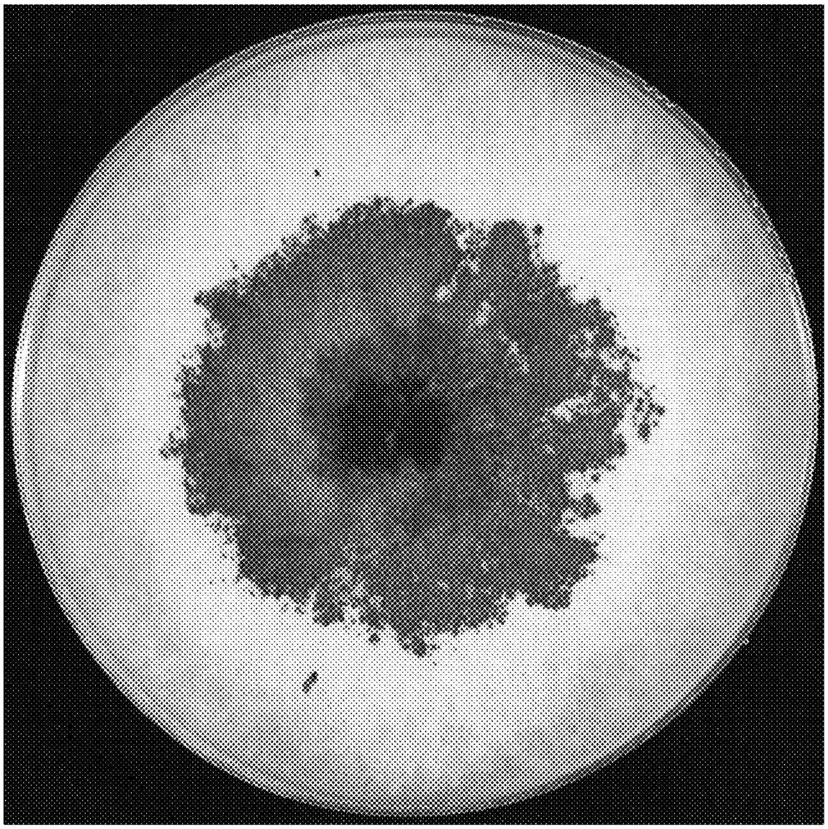
FIG. 1 shows an image of the colony morphology of the endophytic fungal strain Magnaporthaceae sp. M-B927.
Figure 2:
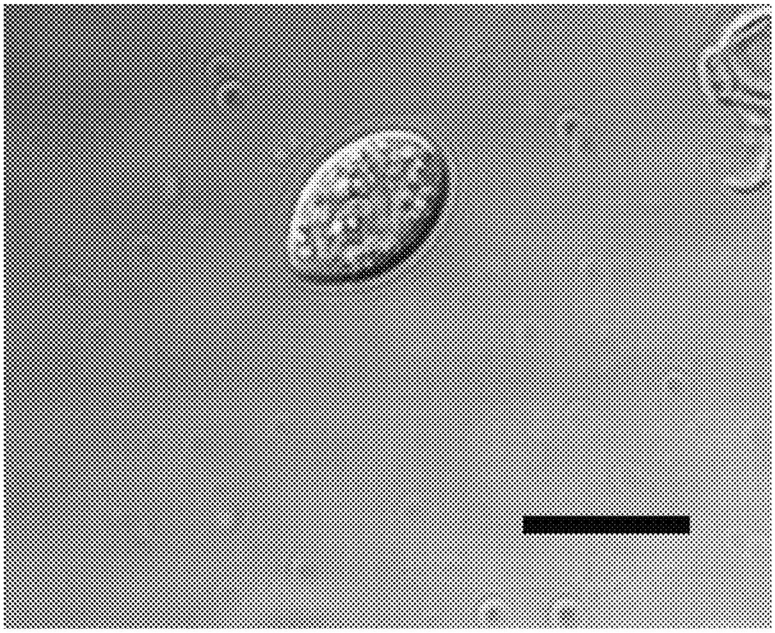
FIG. 2 shows an optical microscope image of conidia morphology of the endophytic fungal strain Magnaporthaceae sp. M-B927, where the bar is 10 μm.
Figure 3:
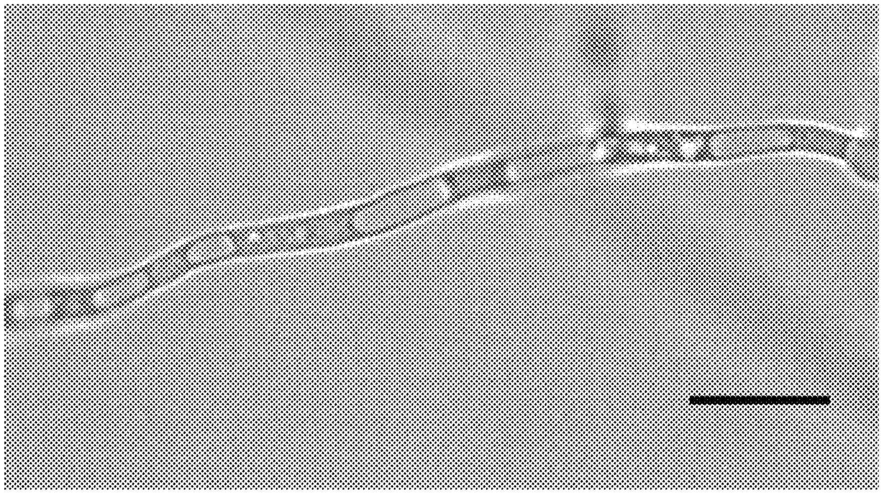
FIG. 3 shows an optical microscope image of mycelia morphology of the endophytic fungal strain Magnaporthaceae sp. M-B927, where the bar is 10 μm.

The isolated and purified strain M-B927 was inoculated on a PDA medium and cultivated at 25° C. for 7 days. A small amount of the fungal mass was picked with an inoculation loop to prepare a slide for observation, measurement and imaging under an optical microscope. The growth status of the colony is shown in FIG. 1, the morphology of conidia is shown in FIG. 2, and the morphology of mycelia is shown in FIG. 3.

The morphological characteristics thereof are that, the colony grew fast on the PDA plate and the colony diameter reached 6 cm after growing on the PDA plate at 25° C. for 5 days; aerial mycelia were poorly developed, prostrating on medium surface, and the colony was white initially and, at a later stage, the middle of the colony turned black while the outer ring was white, the mycelia were 2-4 μm in width (mycelia); conidiophores were solitary, unbranched; conidia were elliptic, no septum, 8.0-13.0×5.0-8.0 μm.

2. Molecular Identification 2.1 Identification of ITS rDNA Gene of the Fungus (1) DNA Extraction ① After the culture of the strain M-B927 on the PDA plate at 25° C. for 7 days, the mycelia were collected from the plate with a tooth pick and transferred into a sterilized 1.5 mL centrifuge tube containing 300 μL extraction buffer (1 M KCl, 100 mM Tris-HCl, 10 mM EDTA, pH=8.0).

② The fungal mass was pulverized with an electric grinder and vigorously vortexed for 2 min.

③ The mass was centrifuged at 10000 rpm for 10 min.

④ The supernatant was pipetted to a second clean centrifuge tube, and the precipitate was discarded.

⑤ Isopropanol (AR) was added to the supernatant in an equal volume, and mixed by inverting the tube gently several times, then centrifuged at 12000 rpm for 10 min to precipitate the nucleic acid.

⑥ The supernatant was discarded gently, and the centrifuge tube containing the precipitate was put on an absorbent paper upside down to drain water.

⑦ Subsequently, 300 μL 70% ethanol was added and mixed with the precipitate by inverting the tube gently several times and then centrifuged at 12000 rpm for 2 min.

⑧ The supernatant was discarded gently, and step ⑦ was repeated once.

⑨ The centrifuge tube was placed on an absorbent paper upside down to drain water, and placed at 37° C. for 15 min such that ethanol was fully evaporated.

⑩ The precipitate was resuspended in 50 μL $ddH_2O$ to obtain the genomic DNA of M-B927 with a concentration up to 30 ng/μL.

(2) PCR Amplification of ITS rDNA Gene of the Fungus

The PCR amplification was performed in a 50 μL reaction system containing: 2 μM each of an upstream primer and a downstream primer, 200 μM of dNTPs, 1.5 mM of $MgCl_2$, 5 μL of 10×PCR buffer, 2 μL of template DNA, and 2 U of Taq enzyme.

The sequence of the upstream primer ITS1 was 5'-TCCGTAGGTGAACCTGCGG-3' (SEQ ID No. 7), and the sequence of the downstream primer ITS4 was 5'-TCCTCCGCTTATTGATATGC-3' (SEQ ID No. 8).

The PCR amplification reaction was carried out with a Longgene MG96G PCR cycler. The PCR cycling conditions consisted of: pre-denaturation at 94° C. for 2 min; then 35 cycles of denaturation at 94° C. for 30 seconds, annealing at 55° C. for 40 seconds and extension at 72° C. for 1 min; and a final extension at 72° C. for 10 min.

(3) Recovery and Purification of PCR Products

After the completion of the PCR reactions, the PCR products were checked by electrophoresis in 1% agarose gel, and then recovered and purified with the DNA gel purification kit of Axygen Biotechnology Limited, following the step-by-step procedure provided in the kit instructions, the steps being as follows.

① All the 50 μL PCR products were loaded in the wells of the 1% agarose gel for electrophoresis and the gel was run at 5 V/CM for 30 min.

② Following the completion of the electrophoresis, a gel slice containing the target DNA fragment was excised with a scalpel blade under ultraviolet illumination, placed in a 2 mL centrifuge tube and weighed.

③ Buffer DE-A was added to the 2 mL centrifuge tube in which the gel was collected based on 3 mL buffer DE-A for each 1 mg gel; the mixture was held at 75° C. for 10 min, during which time it was vortexed several times until the gel was completely melted.

④ Buffer DE-B of 0.5× Buffer DE-A volume was added and mixed well.

⑤ A Miniprep column was placed in the 2 mL centrifuge tube, the mixture was transferred into the Miniprep column, and centrifuged at 12000 rpm for 1 min and the supernatant was discarded.

⑥ The Miniprep column was placed back into the 2 mL centrifuge tube, 500 μL of Buffer W1 was added, and centrifuged at 12000 rpm for 30 seconds.

⑦ The Miniprep column was placed back into the 2 mL centrifuge tube, 700 μL of Buffer W2 was added, and centrifuged at 12000 rpm for 30 seconds.

⑧ Step ⑦ was repeated once.

⑨ The Miniprep column was placed back into the 2 mL centrifuge tube, and centrifuged at 12000 rpm for 2 min to drain the wash buffer on the membrane.

⑩ The Miniprep column was placed back into the 2 mL centrifuge tube, 50 μL $ddH_2O$ was added, and centrifuged at 10000 rpm for 1 min. The eluted DNA was stored at −20° C.

(4) Gene Sequencing and Sequence Analysis

The purified and recovered target DNA fragments checked by electrophoresis were delivered to Sangon Biotech (Shanghai) for sequencing with an ABIPRISMA377 automatic sequencer. After strict check of the sequencing result, a DNA fragment sequence as shown in SEQ ID No. 1 with a length of 365 bp was obtained.

Homologous or similar nucleotide sequences were searched for and aligned to the obtained nucleotide sequence by BLAST in the GenBank database on the national center for biotechnology information (NCBI) website. According to the BLAST alignment, the coverage of the sequence and sequences under accession numbers KJ855515 and KJ855504 was 100%, and the identity was up to 98.36%. Both of these sequences are derived from ITS rDNA of Magnaporthaceae sp.

As demonstrated by the results of the above molecular identification and morphological identification, the strain belongs to the family Magnaporthaceae in the class Sordariomycetes in the phylum Ascomycota in the kingdom Fungi. Therefore, the strain is named as Magnaporthaceae sp. M-B927.

2.2 Identification of rDNA genes including RPB1, TEF1, SSU, MCMI and LSU derived from the fungus M-B927 for further refinement of M-B927 classification.

(1) The PCR amplification was performed in a 50 μL reaction system containing: 2 μM each of an upstream primer and a downstream primer, 200 μM of dNTPs, 1.5 mM of $MgCl_2$, 5 μL of 10×PCR buffer, 2 μL of template DNA, and 2 U of Taq enzyme. Primers are listed in Table 1.

TABLE 1

| Name of genes | Annealing temperature (° C.) | Name and sequence of primers |
|---|---|---|
| RPB1 | Increased from 57 to 72 at a rate of 0.2° C./s | RPB1-Ac: 5'-GARTGYCCDGGDCAYTTYGG-3' (SEQ ID No. 9) RPB1- Cr: 5'-CCNGCDATNTCRTTRTCCATRTA-3' (SEQ ID No. 10) |
| TEF1 | 57 | EF1-983F: 5'-GCYCCYGGHCAYCGTGAYTT-3' (SEQ ID No. 11) EF1-2218R: 5'-ATGACACCRACRGCRACRGTYTGYAT-3' (SEQ ID No. 12) |
| SSU | 57 | NS1: 5'-GTAGTCATATGCTTGTCTC-3' (SEQ ID No. 13) NS4: 5'-CTTCCGTCAATTCCTTTAAG-3' (SEQ ID No. 14) |
| MCM7 | 57 | MCM7F: 5'-CAGGACTGCAAGGACAAC-3' (SEQ ID No. 15) MCM7R: 5'-GGATCTTCATGCCGTCAC-3' (SEQ ID No. 16) |
| LSU | 57 | LSI: 5'-GTACCCGCTGAACTTAAGC-3' (SEQ ID No. 17) LR5: 5'-TCCTGAGGGAAACTTCG-3' (SEQ ID No. 18) |

The procedures for PCR amplification and product sequencing were the same as in the section 2.1. The sequencing results were strictly checked, and the rDNA sequences of RPB1, TEF1, SSU, MCMI and LSU are as shown in SEQ ID No. 2-6.

(2) Sequence Analysis

Sequence alignment was performed on the national center for biotechnology information (NCBI) website, and the results are shown in Table 2.

TABLE 2

| | Name of genes | | | | | |
|---|---|---|---|---|---|---|
| | ITS | LSU | SSU | MCM7 | RPB1 | TEF1 |
| Accession number | JF414846 | JF414895 | JF414870 | JF710389 | JF710440 | JF710417 |
| Identity | 100% | 100% | / | 97.49% | 99.49% | 99.66% |

Subsequently, the 34 strains including M-B927 were subjected to a phylogenetic analysis of six genes combined, and Bayesian inference trees and Maximum-likelihood (ML) phylogenetic trees were constructed separately with a procedure as below:

① writing the target sequence and the reference sequences to a txt file in the fasta format;

② aligning sequences with Clustal×2.1;

③ correcting the alignment results manually with Genedoc, such as trimming of the head and tail, alignment, etc.

Figure 4:
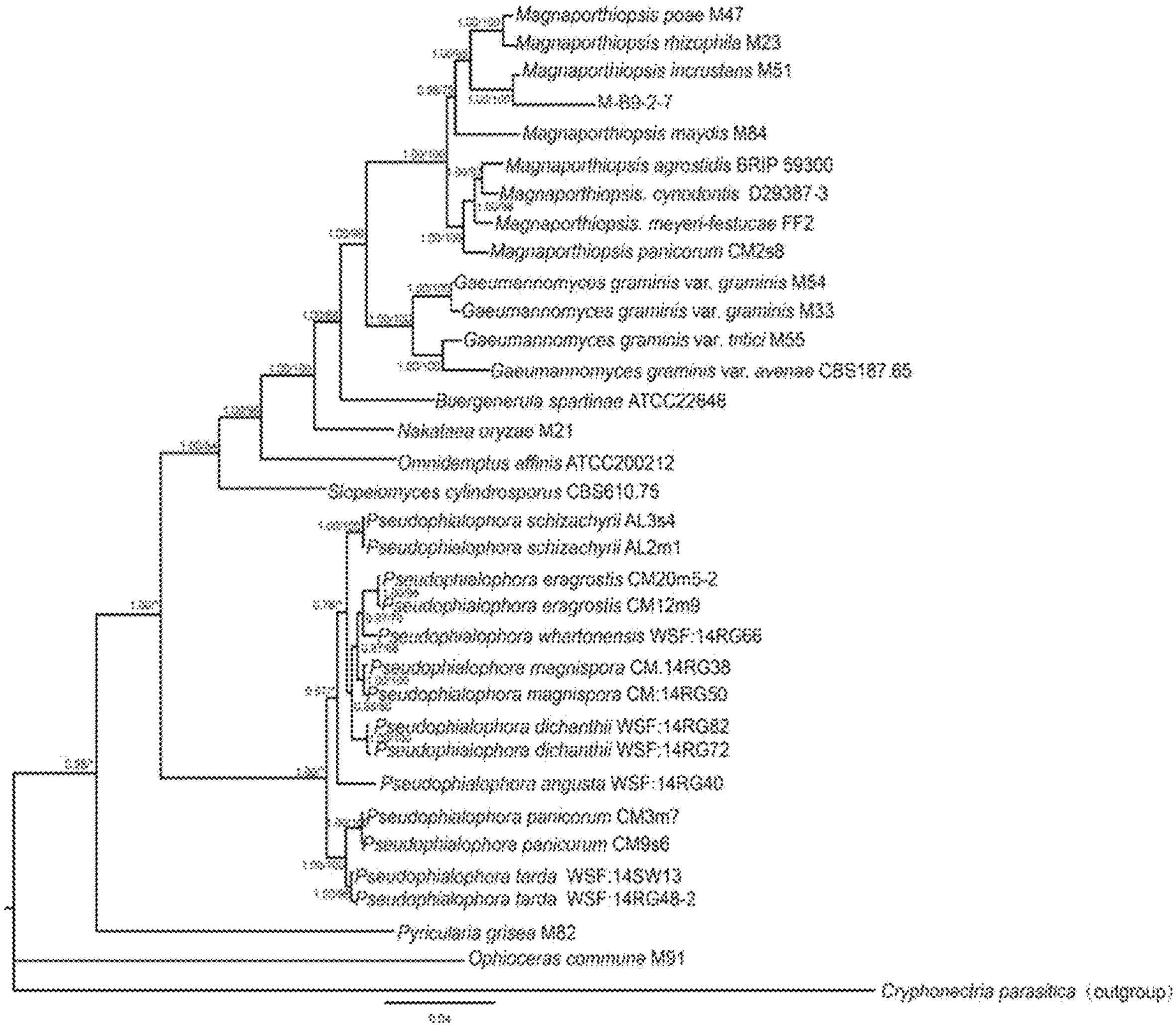
FIG. 4 shows a phylogenetic tree of six genes combined for 34 strains including M-B927.

④ opening *.msf and selecting Export to obtain a clustal (Aln) file; opening the *.aln file with MEGA6, setting outgroup at the top, selecting Export Alignment and choosing the FASTA format to obtain a *.fas file;

⑤ opening *.fas with MEGA6, and obtaining *.NEXUS by selecting Export Alignment and choosing the PAUP format;

⑥ loading the *.fas file to be read by jModelTest 2.1.7, selecting Analysis-Computelikelihood scores, choosing Do AIC calculation to obtain the optimal model, and saving the result;

⑦ modifying the *.nex file against the specimen format, wherein modification of three sets of parameters, including dimensions ntar, nchar and outgroup, was required; additionally, setting the total number of samples to 5000000, the sampling frequency to 100, and the aging sample accounting for 25% of the total number of samples, i.e. 12500;

⑧ running MrBayes, typing exe *.nex and entering, ending the run in the event of a run result P<0.01, otherwise continuing to run, the result file being *.con;

⑨ running the software iqtree, typing \iqtree -s *.fas -m MFP -bb 1000 -bnni -redo and pressing Enter, waiting till the run ends;

⑩ opening the *.con and *.treefile files with the software FigTree. The phylogenetic tree was edited using the software AI with a Bayesian tree as the foundation, and the results are shown in FIG. 4.

As demonstrated by the results, M-B927 and *Magnaporthiopsis incrustans* M51 were in the same branch and had a BI posterior probability of 1 and ML Bootstrap value of 100%. M-B927 was identified by morphological identification results as belonging to *Magnaporthiopsis incrustans* in the family Magnaporthaceae in the class Sordariomycetes in the phylum Ascomycota in the kingdom Fungi.

The strain Magnaporthaceae sp. M-B927 was deposited on May 8, 2021 in the China Center for Type Culture Collection (CCTCC) at Wuhan University in Wuhan, China, the recognized IDA under the Budapest Treaty on the International Recognition of the Deposit of Microorganisms for the Purposes of Patent Procedure, under a deposit number of CCTCC M 2021503.

Example 2 Co-Cultivation of Strain M-B927 and Rice Roots

Test Plant: a Regular Rice Cultivar, C039, of *Oryza sativa* L.

1. Culture of Strain M-B927

Strain M-B927 preserved on a filter paper sheet was inoculated on a potato dextrose agar (PDA) solid medium to be activated through culturing at 25° C. for 7 days in the dark, and then set aside.

2. Rice seeds were peeled and placed in an Erlenmeyer flask, surface-sterilized in 1.0% sodium hypochlorite solution for 15 min, and rinsed 3 times using sterile water and set aside. The sterilized seeds were spread out evenly on a half-strength MS (Murashige and Skoog) medium, sealed with Parafilm sealing film, and placed in a plant incubator set at 25° C. (16 hours under light/8 hours in the dark). When radicles emerged from the seeds in 3 days, the seeds were transferred into tissue culture bottles containing half-strength MS medium, 10 seeds per bottle. Three M-B927 mycelium plugs (diameter 0.5 cm) were inoculated. Blank PDA agar blocks were used as control. 3 replications were performed. Rice seedlings were used for inoculation with the pathogen *Magnaporthe oryzae* when they grew to the stage of 3 leaves on main shoot and fourth appearing (15-20 days).

3. Spray of Conidia of Pathogen *Magnaporthe oryzae*

The pathogen *Magnaporthe oryzae* Guy11 was inoculated in a CM solid medium and cultured at 25° C. under light for 10-12 days. The conidia of Guy11 were collected by rinsing the medium with sterile water, then filtered through 3 layers of filter paper and prepared into a spore suspension with a concentration of $1\times10^5$. Then a 0.4% gelatin solution was prepared and mixed with the spore suspension according to a 1:1 volume ratio such that the final concentration of the spore suspension of *Magnaporthe oryzae* was $5\times10^4$.

The CM medium (1 L) contained: Yeast Extract (1 g), Casamino acid (1 g), D-glucose (10 g), $KH_2PO_4$ (1.52 g), $NaNO_3$ (6 g), Peptone140 (2 g), KCl (0.52 g), $MgSO_4 \cdot 7H_2O$ (0.52 g), 0.1% (v/v) Vitamin solution and 0.1% (v/v) Trace Element. The pH was adjusted to 6.5 with NaOH, and 15 g/L agar was added to the solid medium. The medium was autoclaved at 121° C. for 15 min for sterilization.

The leaves of rice seedlings were sprayed evenly with the spore suspension using a sprayer, 1 mL suspension per bottle. Then the tissue culture bottles were placed in a plant incubator and incubated at 25° C. in the dark for 2 days. After 2 days, light was supplemented (light 16 hours/darkness 8 hours) for a further cultivation of 4-5 days. The scales of rice leaf blast were recorded and the disease index were calculated.

Figure 5:
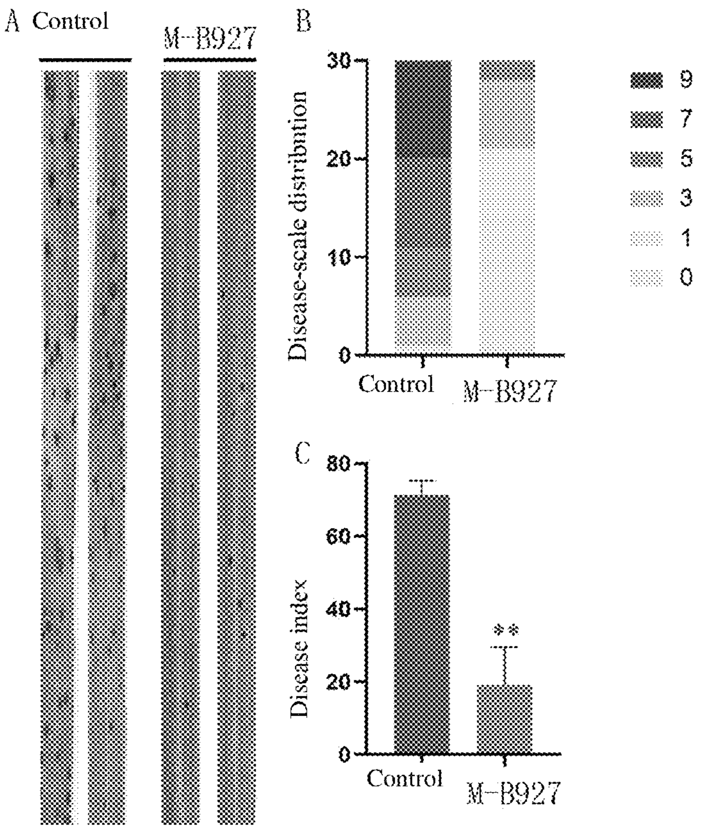
FIG. 5 shows control efficiency of the endophytic fungal strain Magnaporthaceae sp. M-B927 on seedling leaf blast in rice, where "A" demonstrates the disease severity of rice blast on leaves in the strain M-B927 treatment group and the control group; "B" shows a disease-scale index frequency distribution of seedling leaf blast in the strain M-B927 treatment group and the control group; and "C" demonstrates the disease index of seedling leaf blast in the strain M-B927 treatment group and the control group, the data in the charts being mean±SD. Significance level (t-test): $^{**}P<0.01$.

As shown in FIG. 5, serious seedling leaf blast occurred in the control group, and the disease scale on leaves fell mainly between 7-9, and the disease index was 71.48; while in the strain M-B927 treatment group, the incidence of seedling leaf blast was significantly reduced, with the disease scales on most leaves fell between 0-1, and the disease index was 19.26, and compared with the control group, the disease index decreased by 52.22, the control efficiency reaching 73.06%.

The invention claimed is:

1. A method of controlling of rice blast comprising the step of colonizing an endophytic fungus M-B927 in a root tissue of rice, wherein the deposit number of the endophytic fungus M-B927 is CCTCC M 2021503 and the scientific name thereof is Magnaporthaceae sp.

2. The method of claim 1, comprising: co-cultivation of germinated rice seeds and the endophytic fungus M-B927 for colonization of the fungus in roots of rice seedlings to enhance resistance of rice against seedling leaf blast at seedling stage.

3. The method of claim 2, wherein the rice seeds germinate at 22-25° C. after being surface-sterilized.

4. The method of claim 2, wherein the germinated seeds are transferred into a half-strength MS medium, and mycelium plugs of the endophytic fungus M-B927 were inoculated.

5. The method of claim 2, wherein conditions of co-cultivation are: cultivation at 22-25° C. for 15-20 days, under light for 16 hours and in the dark for 8 hours per day.

* * * * *

SEQUENCE LISTING

<160> NUMBER OF SEQ ID NOS: 8

<210> SEQ ID NO 1
<211> LENGTH: 365
<212> TYPE: DNA
<213> ORGANISM: Magnaporthaceae sp.

<400> SEQUENCE: 1
tccgtaggtg gacctgcgga gggatcatta aagagttgca aaactccaac ccctgtgaac 60
cttaccttta ctgttgcttc ggcggttggc gccggtgccc agatgggcct ggaggtcgcc 120
gccggaggtt cgaaaccctg aattctagtg tgtctctgag aaaagaatta aaacaatcaa 180
aactttcaac aacggatctc ttggttctgg catcgatgaa gaacgcagcg aaatgcgata 240
agtaatgtga attgcagaat tcagtgaatc atcgaatctt tgaacgcaca ttgcgcccgc 300
cggtattccg gcgggcatgc ctgtccgagc gtcatttcac cactcaagca cacttgggtg 360
ttggg 365

<210> SEQ ID NO 2
<211> LENGTH: 756
<212> TYPE: DNA
<213> ORGANISM: Magnaporthaceae sp.

<400> SEQUENCE: 2
attcggccac attgagcttg ccaaacctgt ataccatccg ggcttcatca agaaaacgaa 60
gaagatactg gagatggtgt gccacgagtg cggcaagctg ctgtgcgaca aggttagcct 120
gactgggcgc cgcttgctgt gttgttctcg tgctgacgcc cattacagga taatgacgaa 180
ggcttcttgg acgccatccg gacgcgcgac cccaaggtgc gcttcgcccg ggtctgggag 240
atgtgcaagg acaagaagtt ctgtgagaac gagacgacca agaagggcgc cgacaaagaa 300
ggggggttcg acgacaaccc aaaaccacaa cagaacgcca aggtccccca cggtggatgc 360
ggtagcgccc atccaaatat ccgtcagaag gccttggcgc tttttgcaag ggtaaagggc 420
gagggtggtg acgaagaagg cgcccaaaag aaggagatca aagacaagcc catcacggcc 480
gagacggccc atgctgtctt caagaagatc tcagatgagg acctgtggaa catgggcctg 540
aacaaggact acgcgcgccc cgagtggctc atcgtcactg tgctgcctgt ccctcctcct 600
ccagtgcggc ctagcatctc gatggacggt accggcacgg gaatgcgcaa cgaggacgat 660
ttgacctaca agctcggcga tatcattcgc gccaacggaa acgtgaagca ggcgatccag 720
gacggcgcac cggcccacat ctgcctcgag tcgaga 756

<210> SEQ ID NO 3
<211> LENGTH: 882
<212> TYPE: DNA
<213> ORGANISM: Magnaporthaceae sp.

<400> SEQUENCE: 3
gtcattggcg ctggtaccgg tgagttcgag gctggtatct ccaaggacgg ccagacccgt 60
gagcacgctc tgcttgcctt caccctcggt gttaggcagc tcatcgttgc tgtcaacaag 120
atggacactg ccaagtgggc ccagagccga ttcgacgaga tcgtcaagga gaccaagaac 180
ttcatcaaga agattggctt caaccctgac accatcccat tcgtccccat ctcgggcttc 240
aacggcgacc acatgatctc ggagtctgcc gacatgaagg ccaacatctc acccaacgct 300
ccctggtaca agggctggac caagaccatc accaaggacg gcaagaagga gactgtcgtc 360
ggtggtgtct cgctccagga cgccatcgac gatgtcactc cccccaagcg cccgaccgac 420
aagcccctgc gtctgcctct ccaggatgtc tacaagatcg gcggtatcgg cacagtgccc 480
gtcggccgta tcgagactgg tatcctcaag gccggcatgg tcgtcacctt cgcgccctcc 540
aacgtcacca ctgaagtcaa gtccgtcgag atgcaccacc agcagctggc cgagggtgtt 600
cccggcgaca acgtcggttt taacgtgaag aacgtctcgg tcaaggacat ccgccgtggc 660
aacgtcgccg gtgactccaa gaacgaccct cccatgggct gcgcctcgtt caacgcccag 720
gtcatcatcc tgaaccaccc cggccaggtt ggtgctggct acgccccggt tctggactgc 780
cacactgccc acattgcctg caagttctcc gagatggttg agaagctcga ccgccgtacc 840
ggcagtccat tgaggccaac cccaagttca tcagttcggg gg 882

<210> SEQ ID NO 4
<211> LENGTH: 1032
<212> TYPE: DNA
<213> ORGANISM: Magnaporthaceae sp.

<400> SEQUENCE: 4
gatgtctagt atagcattta tacagtgaaa ctgcgaatgg ctcattaaat cagttatcgt 60
ttatttgata gtacctttac tacttggata accgtggtaa ttctagagct aatacatgct 120
aaaaatcccg actgtttgga agggatgtat ttattagata aaaaatcaat gctctttgag 180
ctctttgatg attcataata acttttcgaa tcgcatggcc ttgtgctggc gatggttcat 240
tcaaatttct gccctatcaa ctttcgatgg taggatagtg gcctaccatg gtttcaacgg 300
gtaacgggga ataagggttc gattccggag agggagcctg agaaacggct accacatcca 360
aggaaggcag caggcgcgca aattacccaa tcccgacacg gggaggtagt gacaatacat 420
aacgatacag ggccctttcg ggtcttgtaa ttggaatgag tacaatgtaa ataccttaac 480
gaggaacaat tggagggcaa gtctggtgcc agcagccgcg gtaattccag ctccaatagc 540
gtatattaaa gttgttgcag ttaaaaagct cgtagttgaa ctttgggctt ggttggccgg 600
tccgcctttt tggcgagtac tggacccaac cgagcctttc cttctggcta accattcgcc 660
cttgtggtgt ttggcgaacc aggactttta ctttgaaaaa attagagtgt tcaaagcagg 720
cctttgctcg aatatattag catggaataa tagaatagga cgttatggtt ctattttgtt 780
ggtttctagg accatcgtaa tgattaatag ggacggtcgg gggcatcagt attcagttgt 840
cagaggtgaa attcttagat ttactgaaga ctaactactg cgaaagcatt tgccaaggac 900
gttttcatta atcaagaacg aaagttaggg gatcgaagat gatcagatac cgtcgtagtc 960
ttaaccataa actatgccga ctagggatcg ggtgttgttc ttttttgac gcactcggca 1020 ccttacgaga aa 1032

<210> SEQ ID NO 5
<211> LENGTH: 485
<212> TYPE: DNA
<213> ORGANISM: Magnaporthaceae sp.

<400> SEQUENCE: 5
ggcaagacaa ccagtcgcag ggccagctgc acccgtcctc ccgagcctcc aaattcctgc 60
ccttccagga ggttaaggtt caggagatgg cggagcaggt gcccatcggc cagattccca 120
ggacgctgac cgttctctgt tacggctcgc tggttcggaa ggtcaacccc ggtgacgtcg 180
ccgatattgc tggcatcttc ttgcctaccc cctacacggg cttcaaggcc atgcgcgccg 240
gtctgctcac cgacacgtac cttgaagcgc accatataac ccagcacaag aaggcatacg 300

-continued

```
acgagatggc catcgacagc aggctcgtcc ggaagatcga ccagttcagg gtgtcgggcc    360

acatctacga atacctagcc aagtccatcg cccccgagat cttcggtcat ctcgacgtga    420

agaaggctct gctactattg ctcgtcggag ggtcaccaa gcagatgggt gacggatgga     480

aagat                                                               485


<210> SEQ ID NO 6
<211> LENGTH: 867
<212> TYPE: DNA
<213> ORGANISM: Magnaporthaceae sp.

<400> SEQUENCE: 6

caacagggat tgccccagta acggcgagtg aagcggcaac agctcaaatt tgaaatctgg     60

ccctgggccc gagttgtaat ttgcagagga tgcttttggc gacgcgccta ccgagtcccc    120

tggaacgggg cgccacagag ggtgagagcc ccgtatggtt tgacgcggag cctctgtaaa    180

gctccttcga cgagtcgagt agtttgggaa tgctgctcta aatgggaggt aaatttcttc    240

taaagctaaa taccggccag agaccgatag cgcacaagta gagtgatcga aagatgaaaa    300

gcactttgaa aagagggtta aatagtacgt gaaattgttg aaagggaagc gctcgtgacc    360

agacttgcgc cgggcggatc atccagcgtt ctcgctggtg cactccgccc ggctcaggcc    420

agcatcggtt ttcgccgggg gacaaaagca tcgggaatgt ggctcccctc ggggagtgtt    480

atagcccgga gtgtaatacc ccggcgggga ccgaggaccg cgcttcggca aggatgctgg    540

cgtaatggtc atcagcgacc cgtcttgaaa cacggaccga ggagtcaagc attagtgcga    600

gtgtttgggt gtaaaacccg cacgcgtaat gaaagtgaac gtaggtgaga gcttcggcgc    660

atcatcgacc gatcctgatg ttttcggatg gatttgagta ggagcattaa cgcttggacc    720

cgaaagatgg tgaactatac ttgaataggg tgaagccaga ggaaactctg gtggaggctc    780

gcagcggttc tgacgtgcaa atcgatcgtc aaatttgagt ataggggcga aagactaatc    840

gaaccatcta gtagctggtt accgcag                                        867


<210> SEQ ID NO 7
<211> LENGTH: 19
<212> TYPE: DNA
<213> ORGANISM: Artificial Sequence
<220> FEATURE:
<223> OTHER INFORMATION: Synthesized

<400> SEQUENCE: 7

tccgtaggtg aacctgcgg                                                  19


<210> SEQ ID NO 8
<211> LENGTH: 20
<212> TYPE: DNA
<213> ORGANISM: Artificial Sequence
<220> FEATURE:
<223> OTHER INFORMATION: Synthesized

<400> SEQUENCE: 8

tcctccgctt attgatatgc                                                 20
```